United States Patent Office 3,476,593

Patented Nov. 4, 1969

3,476,593

METHOD OF FORMING GALLIUM ARSENIDE FILMS BY VACUUM DEPOSITION TECHNIQUES

William I. Lehrer, Los Altos, Calif., assignor to Fairchild Camera and Instrument Corporation, Syosset, N.Y., a corporation of Delaware No Drawing. Filed Jan. 24, 1967, Ser. No. 611,245
Int. Cl. B44d *1/02, 1/18;* C23c *13/02*
U.S. Cl. 117—201 10 Claims

ABSTRACT OF THE DISCLOSURE

Gallium arsenide films are formed on a crystalline substrate by simultaneously evaporating gallium oxide and arsenic under vacuum conditions on to substrates maintained at temperatures between 500 and 650° C., and preferably between 550 and 600° C. When the substrate material is monocrystalline and has a crystal structure and lattice spacing similar to that of gallium arsenide, a monocrystalline gallium arsenide film will be epitaxially formed.

This invention relates to a method of forming gallium arsenide films, either monocrystalline (single crystal) or polycrystalline, on crystalline substrates. More particularly, this invention relates to a method of forming gallium arsenide films on crystalline substrates using conventional vacuum evaporation deposition techniques.

As is well-known in the metallurgical arts, and in particular as they pertain to semiconductor and other electronic or electrical devices, thin films of conducting or semiconducting metals may be formed on suitable substrates by a number of different processes. Vapor phase positive pressure reactor systems or vacuum deposition systems may be used. Gallium arsenide films almost invariably use the reactor type system since all attempts to produce gallium arsenide films by direct vacuum deposition resulted in problems of maintaining stoichiometry. Although very high quality films can be produced with the vapor phase reactor systems (an example is described in "Vapor Deposition," Powell, Oxley and Blocher, pages 630–632, John Wiley, 1966) such systems are relatively complex and present a number of problems in the control of the reaction. For example, it is often difficult to accurately control the thickness of the film or the rate of growth. Moreover, because of the numerous constituents necessary in the reactor, it is also difficult to control the purity of the film formed. The uniformity of the thickness of the film is also difficult to control, often resulting in required additional operations to bring the film to uniform thickness. Although for many applications these problems are not of particular importance, in the semiconductor art where the purity and the thickness of the film are of considerable importance, the vapor phase reactor systems are difficult to use.

Although most of the above mentioned problems in vapor phase reactor systems are simplified or eliminated by using a vacuum deposition system, previous attempts to form gallium arsenide films on a substrate by direct vacuum deposition from an evaporated source have not had much success. This has been primarily due to the inability to form a film of gallium arsenide on the substrate which is of sufficient purity to be of much practical value. The various other co-formed reaction products rendered the film useless for practical semiconductor device purposes.

It has been found that the above problems in the prior art may be overcome and a pure gallium arsenide film vacuum deposited on a crystalline substrate by a relatively simple procedure. Briefly, the method according to the invention comprises simultaneously vacuum depositing gallium oxide and arsenic which have been evaporated from suitable sources, on a substrate of crystalline material which is maintained at a temperature ranging between about 500 and 650° C. Preferably, the temperature range is maintained between about 550 to about 600° C. in order to insure the formation of the most satisfactory films. If the gallium arsenide film is desired to have a polycrystalline structure, then the substrate may be formed from any crystalline material. However, if a monocrystalline gallium arsenide film is desired, then the substrate must be formed from monocrystalline material having a crystal structure and lattice parameters similar to that of gallium arsenide.

Turning now to the description of the invention in more detail, in a vacuum deposition system for the vacuum evaporation of metallic films, the substrate is suitably mounted within a chamber which is evacuated to a pressure of at least $10^{-5}$ torr and more typically, to a pressure of between $10^{-5}$ and $10^{-6}$ torr. It should be understood, however, that higher or lower pressures may be used if desired. Also located within the evacuated chamber is one or more source materials located in suitable containers which may be heated in order to produce evaporation of the source materials. Although any type of heating may be used, for example, electron beam heating, electrical resistance heating, etc., preferably, in the type of deposition with which this invention is concerned, the source materials are located in tungsten boats which may be heated by electrical resistance heating. A more complete description of vacuum evaporation deposition systems is contained in Thin-Film Microelectrics by L. Holland, John Wylie and Sons, Inc. 1965, chapter 4.

In order to form a film of gallium arsenide on a substrate in such a system, according to the invention, two sources are used: gallium oxide and arsenic. When these sources are heated to a temperature sufficient to produce vaporization at the existing pressure, e.g., about 500° C. at a pressure of $10^{-5}$ torr, the following reaction occurs at the substrate surface:

$$Ga_2O_3 + 4As \longrightarrow 2GaAs + As_2O_3$$

$$\downarrow$$

$$3Ga_2O + 8As \longrightarrow 6GaAs + As_2O_3$$

The form of the gallium oxide shown in the second reaction equation, although not readily obtainable as a source material due to its unstable nature, results from the evaporation and reduction of the $Ga_2O_3$ source material. In a normal vacuum deposition system wherein the substrate is not heated and/or is not maintained within the very narrow temperature range according to this invention, all of these reaction products will be deposited on the substrate. The resulting film will not be a "pure" gallium arsenide film. Accordingly, in this invention the substrate is mounted within the evacuated chamber in such a manner so that it may be heated to a desired temperature. For example, the substrate may be mounted on a heat conducting metal block having an electrical resistance heater imbedded therein. The substrate is heated and maintained at a temperature between 500° and 650° C. while the deposition is taking place. It has been found that below the 500° C. temperature, all the other reaction products will be deposited on the substrate whereas above about 650° C., breakdown of the gallium arsenide film occurs due to evaporation of the As. Preferably, the substrate is maintained at a temperature ranging between about 550° to about 600° C. to insure that a good film is produced, since between 500° and 550° C. and between 600° and 650° C. partial reactions, i.e., mixed films and partial component breakdown have been found to occur. Within the range of about 550° to about 600° C., however, only stoichiometric gallium arsenide is deposited on the substrate. The other reaction products will not adhere to the substrate within this temperature range in a vacuum, and are expelled from the system.

As mentioned above, if polycrystalline gallium arsenide films are desired, then any type of crystalline substrate material may be used, for example, silicon (either monocrystalline or polycrystalline), III–V compounds, etc. However, if monocrystalline gallium arsenide films are desired, then in order to epitaxially grow the gallium arsenide film on the substrate, the substrate should be monocrystalline and have a similar crystal configuration and lattice parameter spacing to that of gallium arsenide. In addition to monocrystalline gallium arsenide, other materials have the required similar lattice parameters, for example germanium, sodium chloride, and rubidium fluoride. Monocrystalline silicon cannot be used as the substrate material for epitaxial growth of GaAs since its crystal structure is dissimilar.

A number of examples of gallium arsenide thin films formed according to the method of the invention and the operating conditions are indicated below. In all of the examples, gallium oxide ($Ga_2O_3$) and arsenic were used as the source materials and the depositions took place in a vacuum between $10^{-5}$ and $10^{-6}$ torr.

EXAMPLE I

A monocrystalline germanium substrate was placed in the vacuum chamber containing the evaporated source materials and maintained at a temperature between 500–525° C. during the vacuum deposition period. Studies of the result film by means of electron microscopy indicated that although it was monocrystalline gallium arsenide, it was structurally poor and there was evidence of contamination by other reaction products.

EXAMPLE II

A monocrystalline germanium substrate was placed in the vacuum chamber containing the same source materials and maintained at a temperature between 550° and 600° C. during the deposition period. The same tests indicated that a good, i.e., pure, epitaxially deposited monocrystalline gallium arsenide film resulted.

EXAMPLE III

A monocrystalline germanium substrate was placed in a vacuum chamber containing the same evaporated source materials and maintained at a temperature between 600° and 650° C. during the deposition period. Diffraction data on the resulting gallium arsenide film indicated that the film was of a mixed nature.

EXAMPLE IV

A monocrystalline silicon substrate was placed in a vacuum chamber containing the same evaporated source materials and maintained at a temperature between 550° and 600° C. Tests indicated that the resulting film was a structurally "pure" polycrystalline gallium arsenide film.

As can easily be appreciated from the above discussion, the method according to the invention of forming thin films of either monocrystalline or polycrystalline silicon has the advantage if being extremely simple. Moreover, the films formed in this manner possess all the advantages of vacuum deposition systems, for example, evenness of the film, ease of monitoring of the reaction conditions, as well as the benefit of the well-developed vacuum deposition technology. In particular, such systems allow close control of the thickness of the films, hence, enabling the method to be used quite advantageously for the formation of monocrystalline gallium arsenide films for use in field effect transistors and Gunn effect devices as well as for forming a base coating for other vapor phase depositions.

What is claimed is:

1. A method of forming a film of gallium arsenide on a suitable substrate comprising: simultaneously vacuum depositing evaporated gallium oxide and arsenic on a substrate of crystalline material which is maintained at a temperature between 500° and 650° centigrade.

2. The method of claim 1 wherein said temperature is between about 550° and 600° centigrade.

3. A gallium arsenide film formed on a selected substrate by the method of claim 2.

4. The method of claim 2 wherein said crystalline material is silicon.

5. A method of epitaxially forming a film of monocrystalline gallium arsenide on a suitable substrate comprising:

simultaneously vacuum depositing exaporated gallium oxide and arsenic on a substrate of monocrystalline material having a similar crystal structure and lattice parameter spacing to that of gallium arsenide while maintaining the substrate at a temperature between 500° and 650° centigrade.

6. The method of claim 5 wherein said temperature is maintained in a range between about 550° to about 600° centigrade.

7. The method of claim 6 wherein said substrate material is germanium.

8. The method of claim 6 wherein said substrate material is gallium arsenide.

9. The method of forming a film of gallium arsenide on a substrate which comprises:

placing gallium oxide and arsenic sources, and a monocrystalline substrate whose crystal configuration and lattice spacing are similar to that of gallium arsenide, in a reactor;

evacuating the reactor;

heating the substrate to between 550° C. and 600° C., and heating said gallium oxide and arsenic sources to a temperature to vaporize the gallium oxide and arsenic so that a reaction between gallium oxide vapors and arsenic vapors occurs at the surface of said heated substrate resulting in the epitaxial growth of a pure monocrystalline gallium arsenide film on said substrate surface.

10. The method of claim 9 in which the following reaction takes place at the surface of said heated substrate $$Ga_2O_3+4AS \rightarrow 2GaAs+As_2O_3$$

$$\downarrow$$

$$3Ga_2O+8AS \longrightarrow 6GaAs+As_2O_3$$

where $Ga_2O_3$ is gallium oxide
$Ga_2O$ is an unstable form of gallium oxide
GaAs is gallium arsenide and $As_2O_3$ is an oxide of arsenic, arsenic trioxide

References Cited

UNITED STATES PATENTS

| | | | |
|---|---|---|---|
| 2,938,816 | 5/1960 | Gunther. | |
| 3,178,313 | 4/1965 | Moest | 117—201 |
| 3,197,411 | 7/1965 | Frosch. | |
| 3,322,501 | 5/1967 | Woodall | 23—204 |
| 3,310,425 | 3/1967 | Goldsmith | 148—175 X |
| 3,346,414 | 10/1967 | Ellis et al. | |

FOREIGN PATENTS

| | | |
|---|---|---|
| 727,519 | 2/1966 | Canada. |

ANDREW G. GOLIAN, Primary Examiner

U.S. Cl. X.R.

23—204; 117—106